United States Patent [19]

Ishii et al.

[11] Patent Number: 5,402,239
[45] Date of Patent: Mar. 28, 1995

[54] METHOD OF MEASURING ORIENTATION FLAT WIDTH OF SINGLE CRYSTAL INGOT

[75] Inventors: Yasuhiro Ishii, Fukushima, Japan; Yoshihiro Hirano, Vancouver, Wash.

[73] Assignee: Shin-Etsu Handotai Co., Ltd., Tokyo, Japan

[21] Appl. No.: 203,570

[22] Filed: Mar. 1, 1994

[30] Foreign Application Priority Data

Mar. 4, 1993 [JP] Japan .................. 5-043488

[51] Int. Cl.⁶ .................................. C01B 5/02
[52] U.S. Cl. ............................ 356/387; 356/383
[58] Field of Search ............ 356/372, 383, 384, 387, 356/150; 250/560

[56] References Cited

U.S. PATENT DOCUMENTS

| 4,300,836 | 11/1981 | Holmes et al. |  |
|---|---|---|---|
| 5,042,945 | 8/1991 | Shibata et al. | 356/150 |

FOREIGN PATENT DOCUMENTS

| 2551805 | 5/1977 | Germany | 350/384 |
|---|---|---|---|
| 4104602C1 | 6/1992 | Germany . | |
| 58-190704 | 11/1983 | Japan . | |
| 4284642 | 10/1992 | Japan | 356/383 |
| 2166548 | 5/1986 | United Kingdom . | |
| 2218513 | 11/1989 | United Kingdom . | |

*Primary Examiner*—Richard A. Rosenberger
*Attorney, Agent, or Firm*—Nikaido, Marmelstein, Murray & Oram

[57] ABSTRACT

Disclosed is a method of measuring the OF width of a cylindrical single crystal ingot using an optical non-contact type displacement measuring device. This method can avoid the labor and measurement errors as generally seen in the conventional manual method and provide an easy and precise measurement. Further, the method can be automated if necessary. This method comprises the steps of detecting the boundary points between the OF and the round surface of the single crystal ingot from the displacement to be obtained by scanning the sensor while detecting the distance between the sensor and the ingot surface including the OF, and calculating the OF width C from the scanning distance A of the sensor from the first boundary point detection position to the second boundary point detection position and the difference B between the first distance $l_1$ from the first boundary point to the sensor and the second distance $l_2$ from the sensor to the second boundary point.

1 Claim, 3 Drawing Sheets

METHOD OF MEASURING ORIENTATION FLAT WIDTH OF SINGLE CRYSTAL INGOT

BACKGROUND OF THE INVENTION

1. Field of the Invention

The present invention relates to a method of measuring with ease the width of the orientation flat (hereinafter referred to as "OF") which indicates the crystallographic orientation of a single crystal ingot.

2. Description of the Prior Art

The measurement of the OF width in the surface of a cylindrical single crystal ingot has been carried out by reading graduations of a scale, such as slide calipers, placed on the corresponding OF portion. However, such a manual measurement requires much labour and can not avoid measurement errors. Thus an easy and precise method of measuring the OF width has been required.

SUMMARY OF THE INVENTION

The present invention was made in the light of the above problems of the prior art. Therefore, the primary object of this invention is to provide a method of measuring the OF width of a single crystal ingot using an optical non-contact type displacement measuring device, which can avoid the labour and measurement errors as inevitably occurring in the aforementioned manual method and realize an easy and precise measurement which can be automated if necessary.

According to the present invention, there is provided a method of measuring the OF width of a single crystal ingot by the use of an apparatus including an optical non-contact type displacement measuring device having a sensor, means for fixing the OF of the single crystal ingot facing to the sensor, means for scanning the sensor in the direction normal to the major axis of the single crystal ingot and means for measuring the scanning distance, comprising the steps of: detecting the boundary points between the OF and the round surface of the single crystal ingot from the displacement to be measured by scanning the sensor while detecting the distance between the sensor and the ingot surface including the OF; measuring the scanning distance A of the sensor from the first boundary point detection position to the second boundary point detection position; detecting the first distance $l_1$ from the first boundary point to the sensor and the second distance $l_2$ from the sensor to the second boundary point to obtain $B = |l_1 - l_2|$; and calculating the OF width C in accordance with the following equation (1).

$$C^2 = A^2 + B^2 \qquad (1)$$

The optical non-contact type displacement measuring device of this invention can measure the position of an object by forming an image on a photo-position detector with the reflection light which is originally emitted from a light source to make a focus near the object and reflected by the object, and by utilizing a positional change of the image corresponding to the position of the object. For example, laser type displacement sensors can be used as the displacement measuring device.

The measurement principle of the present invention is described with reference to FIG. 1. A sensor 6 of an optical non-contact type displacement measuring device has a structure scannable on a scanning shaft 11. The scanning distance on the scanning shalt 11 may be measured either by a mechanical or electrical means.

As the mechanical means, for example, there is a method of obtaining the scanning distance by diameters and the number of rotation of gears provided in the contact portion between the sensor 6 and the scanning shaft 11. As the electrical means, for example, there can be adopted a method constructed by providing a linear scale 12 comprising magnetic materials disposed at predetermined intervals on the scanning shaft 11 and adding to the sensor 6 a device for detecting the magnetic field, thereby counting the number of magnetic materials to obtain the scanning distance.

In FIG. 1, a single crystal ingot 2, the OF width of which is measured, is fixed on a place where an OF 4 of the single crystal ingot 2 faces to the sensor 6. A laser beam emitted from a light source 8 of the sensor 6 is projected onto the OF 4 and irregularly reflected thereon, and only the reflected light beam that is coincident with the optic axis of a photo-position sensor 10 is measured. The angle defined by the OF 4 and the bisector between the optic axes of the light beam from the light source 8 and of the light beam to be measured by the photo-position sensor 10 is preferably in the range of $\pm 15$ degrees, and more preferably in the range of $\pm 5$ degrees.

In addition, the single crystal ingot 2 is fixed by an ingot holder (not shown) so that the major axis of the OF 4 is arranged in the direction normal to the scanning shaft 11 of the sensor 6.

According to the present invention, with an optical non-contact type displacement measuring device having a sensor, a cross-sectional shape on the side of an OF of a single crystal ingot can be measured by scanning the sensor along the direction normal to the major axis of the OF while measuring the distance between the OF and the sensor. Moreover, the OF width can be calculated in accordance with the Pythagorean theorem by detecting the boundary two points between the OF and the round surface of the single crystal ingot from the measured cross-sectional shape, and then obtaining the respective distances between the boundary two points and the sensor and the difference of those distances.

These and other objects, features and advantages of the present invention will be more apparent from the following description of a preferred embodiment, taken in conjunction with the accompanying drawings.

BRIEF DESCRIPTION OF THE EMBODIMENT

DETAILED DESCRIPTION OF THE PREFERRED EMBODIMENT

A method of this invention for measuring the OF width of a single crystal ingot will be described below in greater detail with reference to the accompanying sheets of drawings.

Figure 1:
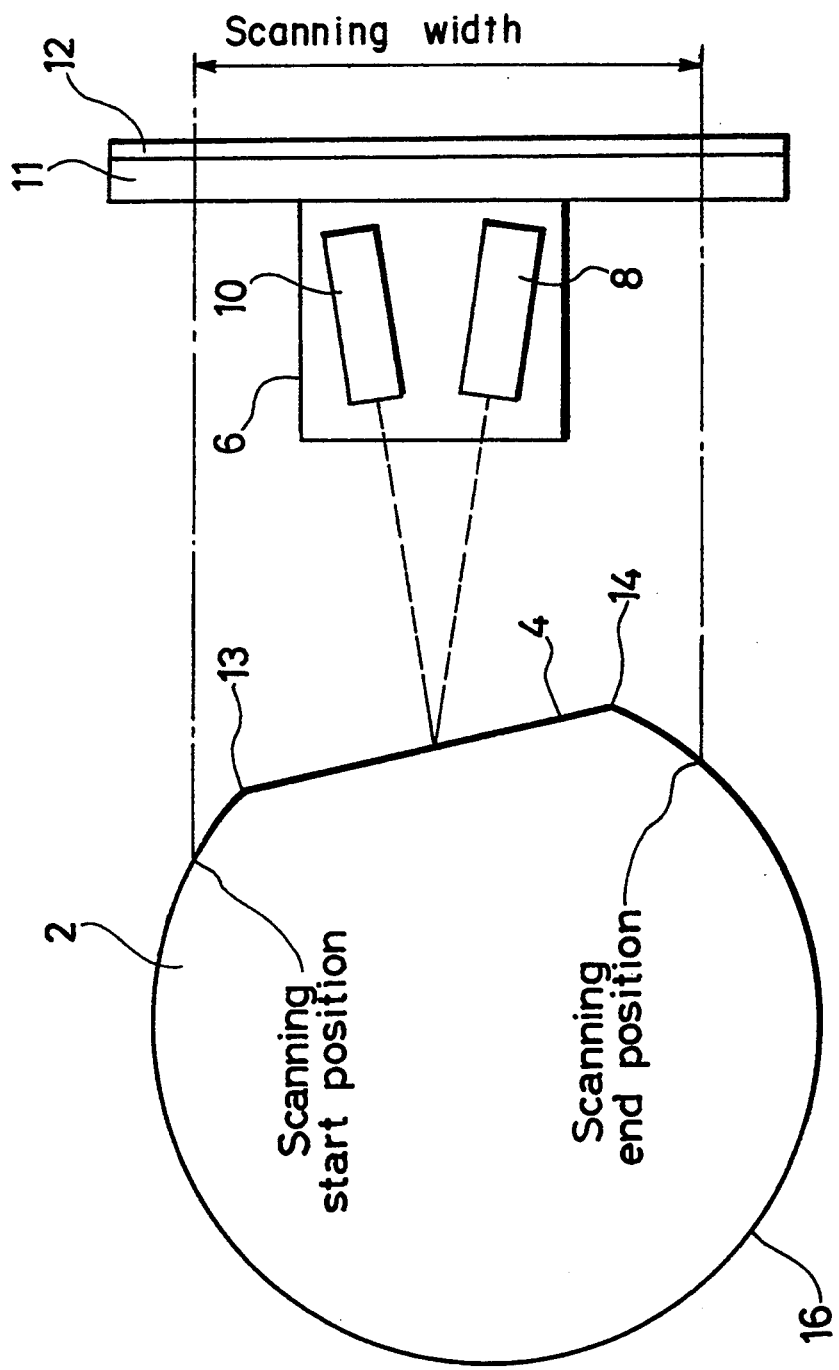
FIG. 1 is a diagrammatical view illustrative of the principle of a method according to the present invention for measuring the OF width of a single crystal ingot.

FIG. 1 diagrammatically shows the principle of the OF width measuring method of this invention.

In FIG. 1, reference numeral 2 designates a cylindrical single crystal ingot along the length of which an OF 4 is formed. A sensor 6 is placed to turn itself to the OF 4 of the single crystal ingot 2, and is movably mounted on a scanning shaft 11 extending in the direction normal to the major axis of the single crystal ingot. Further, reference numeral 12 denotes a linear scale provided on the scanning shaft 11.

The sensor 6 has a light source 8 and a photo-position sensor 10. From the light source 8 a beam of light, for example, a laser beam is emitted and projected onto the surface of the single crystal ingot 2. Then, a portion of the light beam irregularly reflected on the ingot surface is detected by the photo-position sensor 10, thereby to measure the distance from the sensor 6 to the surface of the single crystal ingot 2. Accordingly, by scanning the sensor 6 along the scanning shaft 11 while facing to the single crystal ingot 2, the surface configuration of the single crystal ingot 2 can be detected with ease.

In this embodiment, the scanning distance of the sensor 6 on the scanning shaft 11 may be measured either by the aforementioned mechanical means or by an electrical means including a linear scale 12.

Figure 2:
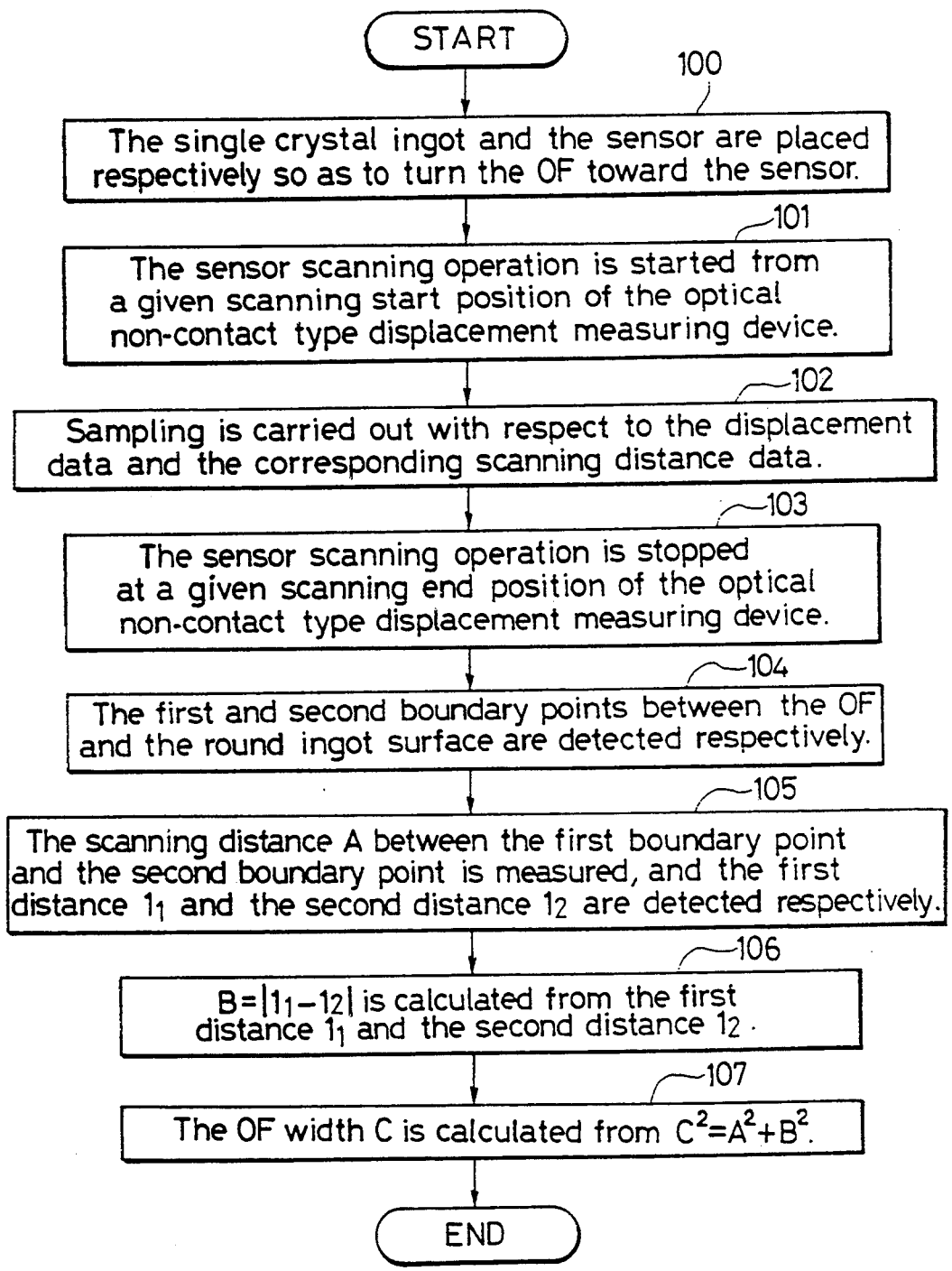
FIG. 2 is a flow-chart showing a procedure of a method according to the present invention.

A procedure for carrying out the OF width measuring method of this invention using the sensor 6 will be described with reference to FIG. 1 and a flow-chart shown in FIG. 2.

First, the single crystal ingot 2 and the sensor 6 are placed respectively so as to turn the OF 4 toward the sensor 6 (Step 100). Then, the scanning operation is started from a given scanning start position outside the first boundary point 13 between the OF 4 and the round ingot surface 16 (Step 101).

During the scanning operation of the sensor 6, sampling is carried out with respect to the displacement data of the OF 4 and the corresponding data on the scanning distance of the sensor 6 (Step 102). The data sampled is sent to a calculator (not shown).

The scanning operation is stopped when the sensor 6 reaches a given scanning end position outside the second boundary point 14 between the OF 4 and the round ingot surface 16 (Step 103).

Thereafter, the calculator computes the measured shape in accordance with a predetermined program, thereby to automatically obtain the first and second boundary points 13 and 14 from the change of the measured shape (Step 104).

Then, the scanning distance A of the sensor 6 from the detection position of the first boundary point 13 to that of the second boundary point 14 is measured, and the first distance $l_1$ between the first boundary point 13 and the sensor 6 and the second distance $l_2$ between the second boundary point 14 and the sensor 6 are detected respectively (Step 105). Thereafter, $B = |l_1 - l_2|$ is calculated (Step 106).

Figure 3:
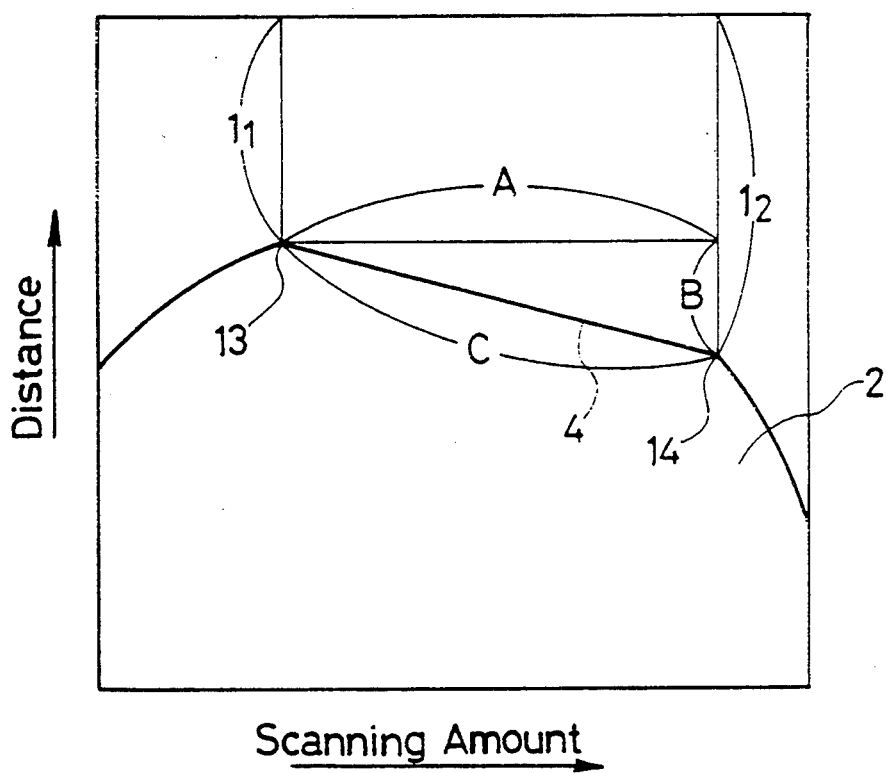
FIG. 3 is a graph showing displacement data of the OF of the single crystal ingot measured by an optical non-contact type displacement measuring device and showing the location of the OF width C in relation to the scanning distance A and the difference B between the first and second distances $l_1$ and $l_2$.

FIG. 3 is a graph showing displacement data of the OF 4 of the single crystal ingot 2 measured by the optical non-contact type displacement measuring device. In the same drawing, the scanning distance A, the first distance $l_1$ from the first boundary point 13 to the sensor 6 and the second distance $l_2$ from the sensor 6 to the second boundary point 14, and $B = |l_1 - l_2|$ are shown respectively.

As is apparently seen from FIG. 3, the scanning distance A and the difference B between the first distance $l_1$ and the second distance $l_2$ are designated as the base and the altitude in a right-angled triangle respectively. Therefore the Pythagorean theorem can be applied to obtain the OF width C.

Accordingly the OF width C can be calculated by the following equation (1) (Step 107).

$$C^2 = A^2 + B^2 \qquad (1)$$

As stated above, according to the present invention, there is provided a method of measuring the OF width of a single crystal ingot using an optical non-contact type displacement measuring device. Thus it becomes possible to avoid the labour and measurement error occurrence as inevitable in the prior art manual method, thereby providing an easy and precise measurement method of non-contact with the single crystal ingot surface and, if necessary, capable of performing an automated measurement.

Various modifications will become possible for those skilled in the art after receiving the teachings of the present disclosure without departing from the scope thereof.

What is claimed is:

1. A method of measuring the orientation flat width of a single crystal ingot by the use of an apparatus including an optical non-contact type displacement measuring device having a sensor, means for fixing the orientation fiat of the single crystal ingot facing to the sensor, means for scanning the sensor in the direction normal to the major axis of the single crystal ingot and means for measuring the scanning distance, comprising the steps of:

(a) detecting the boundary points between the orientation flat and the round surface of the single crystal ingot from the displacement to be measured by scanning the sensor while detecting the distance between the sensor and the ingot surface including the orientation flat;
  (b) measuring the scanning distance A of the sensor from the first boundary point detection position to the second boundary point detection position;
  (c) detecting the first distance $l_1$ from the first boundary point to the sensor and the second distance $l_2$ from the sensor to the second boundary point to obtain $B = |l_1 - l_2|$; and
  (d) calculating the orientation flat width C in accordance with the following equation (1):

$$C^2 = A^2 + B^2 \qquad (1).$$

* * * * *